United States Patent
Reddy et al.

(10) Patent No.: US 7,650,940 B2
(45) Date of Patent: Jan. 26, 2010

(54) CEMENT COMPOSITIONS COMPRISING PARTICULATE CARBOXYLATED ELASTOMERS AND ASSOCIATED METHODS

(75) Inventors: B. Raghava Reddy, Duncan, OK (US); Krishna M Ravi, Kingwood, TX (US)

(73) Assignee: Halliburton Energy Services Inc., Duncan, OK (US)

( * ) Notice: Subject to any disclaimer, the term of this patent is extended or adjusted under 35 U.S.C. 154(b) by 0 days.

(21) Appl. No.: 11/321,113

(22) Filed: Dec. 29, 2005

(65) Prior Publication Data

US 2007/0151730 A1 Jul. 5, 2007

(51) Int. Cl.
*E21B 33/13* (2006.01)
*E21B 33/14* (2006.01)

(52) U.S. Cl. .................. 166/293; 166/285; 166/292
(58) Field of Classification Search .................. None
See application file for complete search history.

(56) References Cited

U.S. PATENT DOCUMENTS

| | | | |
|---|---|---|---|
| 3,406,756 A | 10/1968 | Carter et al. | 166/21 |
| 3,719,230 A | 3/1973 | Kemp et al. | 166/376 |
| 3,730,271 A | 5/1973 | Gall | 166/294 |
| 4,088,808 A | 5/1978 | Cornwell et al. | 428/409 |
| 4,174,230 A | 11/1979 | Hashimoto et al. | 106/660 |
| 4,421,169 A | 12/1983 | Dearth et al. | 166/285 |
| 4,460,627 A | 7/1984 | Weaver et al. | 527/212 |
| 4,486,316 A * | 12/1984 | Carriere et al. | 507/119 |
| 4,532,052 A | 7/1985 | Weaver et al. | 252/8.55 R |
| 4,649,998 A | 3/1987 | Friedman | 166/294 |
| 5,122,554 A | 6/1992 | Allen | |
| 5,159,980 A | 11/1992 | Onan et al. | 166/294 |
| 5,293,938 A | 3/1994 | Onan et al. | 166/293 |
| 5,389,706 A | 2/1995 | Heathman et al. | 524/5 |
| 5,420,174 A | 5/1995 | Dewprashad | 523/130 |
| 5,564,413 A | 10/1996 | Hori et al. | 138/137 |
| 5,588,488 A | 12/1996 | Vijn et al. | 166/293 |
| 5,688,844 A | 11/1997 | Chatterji et al. | 524/8 |
| 5,697,440 A | 12/1997 | Weaver et al. | 166/281 |
| 5,738,463 A | 4/1998 | Onan | 405/154 |
| 5,775,425 A | 7/1998 | Weaver et al. | 166/276 |
| 5,779,787 A | 7/1998 | Brothers et al. | 106/802 |
| 5,795,924 A | 8/1998 | Chatterji et al. | 523/130 |

(Continued)

FOREIGN PATENT DOCUMENTS

DE 19732145 1/1999

(Continued)

OTHER PUBLICATIONS

Foreign Communication from a related counter part Application, Apr. 12, 2007.

(Continued)

*Primary Examiner*—Jennifer H Gay
*Assistant Examiner*—Angela M DiTrani
(74) *Attorney, Agent, or Firm*—Craig W. Roddy; Baker Botts, LLP

(57) ABSTRACT

Methods of cementing comprising: providing a cement composition comprising water, a cement, and a particulate elastomer comprising a carboxy group; and allowing the cement composition to set. Cement compositions comprising water, a cement, and a particulate elastomer comprising a carboxy group.

22 Claims, 2 Drawing Sheets

U.S. PATENT DOCUMENTS

| | | | |
|---|---|---|---|
| 5,820,670 A | 10/1998 | Chatterji et al. | 106/727 |
| 5,833,000 A | 11/1998 | Weaver et al. | 166/276 |
| 5,839,510 A | 11/1998 | Weaver et al. | 166/276 |
| 5,860,770 A | 1/1999 | Hunt | 405/264 |
| 5,913,364 A | 6/1999 | Sweatman | 166/281 |
| 5,945,387 A | 8/1999 | Chatterji et al. | 507/224 |
| 5,964,293 A | 10/1999 | Chatterji et al. | 166/294 |
| 6,047,772 A | 4/2000 | Weaver et al. | 166/276 |
| 6,059,034 A | 5/2000 | Rickards et al. | 166/280 |
| 6,098,711 A | 8/2000 | Chatterji et al. | 166/294 |
| 6,167,967 B1 | 1/2001 | Sweatman | 166/281 |
| 6,209,643 B1 | 4/2001 | Nguyen et al. | 166/276 |
| 6,234,251 B1 | 5/2001 | Chatterji et al. | 166/295 |
| 6,244,344 B1 | 6/2001 | Chatterji et al. | 166/295 |
| 6,271,181 B1 | 8/2001 | Chatterji et al. | 507/219 |
| 6,308,777 B2 | 10/2001 | Chatterji et al. | 166/293 |
| 6,330,917 B2 | 12/2001 | Chatterji et al. | 166/295 |
| 6,508,305 B1 | 1/2003 | Brannun et al. | 166/293 |
| 6,582,819 B2 | 6/2003 | McDaniel et al. | 428/402 |
| 6,593,402 B2 | 7/2003 | Chatterji et al. | 524/7 |
| 6,599,863 B1 | 7/2003 | Palmer et al. | 507/219 |
| 6,632,527 B1 | 10/2003 | McDaniel et al. | 428/402 |
| 6,668,928 B2 | 12/2003 | Brothers | 166/292 |
| 6,830,105 B2 | 12/2004 | Thesing | 166/280.1 |
| 6,832,651 B2 | 12/2004 | Ravi et al. | 166/292 |
| 7,007,755 B2 | 3/2006 | Reddy et al. | 166/294 |
| 7,022,755 B1 | 4/2006 | Chatterji et al. | 524/8 |
| 7,036,586 B2 | 5/2006 | Roddy et al. | 166/277 |
| 7,138,446 B2 | 11/2006 | Reddy et al. | 524/4 |
| 7,138,449 B2 | 11/2006 | Valentine et al. | 524/120 |
| 2003/0224165 A1 | 12/2003 | Anderson et al. | 428/403 |
| 2004/0043906 A1 | 3/2004 | Heath et al. | 507/200 |
| 2004/0055748 A1 | 3/2004 | Reddy et al. | 166/293 |
| 2004/0144537 A1 | 7/2004 | Reddy et al. | 166/292 |
| 2004/0171499 A1 | 9/2004 | Ravi et al. | 507/200 |
| 2004/0171742 A1* | 9/2004 | Estrin | 524/571 |
| 2004/0198872 A1 | 10/2004 | Reddy et al. | 524/3 |
| 2005/0028981 A1 | 2/2005 | Reddy et al. | 166/295 |
| 2005/0061206 A1 | 3/2005 | Reddy et al. | 106/672 |
| 2005/0211445 A1 | 9/2005 | Ravi | 166/380 |
| 2006/0035790 A1 | 2/2006 | Okell et al. | 507/269 |
| 2006/0122071 A1* | 6/2006 | Reddy et al. | 507/219 |
| 2007/0151484 A1 | 7/2007 | Reddy et al. | 106/638 |

FOREIGN PATENT DOCUMENTS

| | | |
|---|---|---|
| EP | 834644 | 4/1998 |
| EP | 853186 | 7/1998 |
| EP | 1400497 | 3/2004 |
| GB | 1093094 | 11/1967 |
| GB | 1352388 | 5/1974 |
| JP | 2247217 | 2/1990 |
| WO | WO 2005/093202 | 10/2005 |
| WO | WO 2007074330 | 7/2007 |

OTHER PUBLICATIONS

Office Action dated May 12, 2008 from U.S. Appl. No. 11/321,268.
Office Action mailed Oct. 24, 2008, for U.S. Appl. No. 11/321,268.
Office Action for U.S. Appl. No. 11/321,268, dated Apr. 20, 2009.

* cited by examiner

CEMENT COMPOSITIONS COMPRISING PARTICULATE CARBOXYLATED ELASTOMERS AND ASSOCIATED METHODS

CROSS-REFERENCE TO RELATED APPLICATIONS

The present invention is related to U.S. patent application Ser. No. 11/321,268, entitled "Cement Compositions Comprising Particulate Carboxylated Elastomers and Associated Methods," filed on the same date herewith, the entire disclosure of which is incorporated herein by reference.

BACKGROUND

The present invention relates to cementing operations and, more particularly, to cement compositions comprising particulate carboxylated elastomers and associated methods.

Cement compositions are commonly utilized above ground (e.g., in the construction industry) and in subterranean operations, particularly subterranean well completion and remedial operations. For example, cement compositions are used in primary cementing operations whereby pipe strings such as casings and liners are cemented in well bores. In performing primary cementing, cement compositions are pumped into the annular space between the walls of a well bore and the exterior surface of the pipe string disposed therein. The cement composition is permitted to set in the annular space, thereby forming an annular sheath of hardened substantially impermeable cement therein that substantially supports and positions the pipe string in the well bore and bonds the exterior surface of the pipe string to the walls of the well bore. Cement compositions also are used in remedial cementing operations such as plugging highly permeable zones or fractures in well bores, plugging cracks and holes in pipe strings, and the like.

Once set, the cement sheath may be subjected to a variety of cyclic, shear, tensile, impact, flexural, and/or compressive stresses that may lead to failure of the cement sheath, resulting, for example, in fractures, cracks, and/or debonding of the cement sheath from the pipe string and/or the formation. This may lead to undesirable consequences such as lost production, environmental pollution, hazardous rig operations resulting from unexpected fluid flow from the formation caused by the loss of zonal isolation, and/or hazardous production operations. Cement failures may be particularly problematic in high temperature wells, where fluids injected into the wells or produced from the wells by way of the well bore may cause the temperature of any fluids trapped within the annulus to increase. Furthermore, high fluid pressures and/or temperatures inside the pipe string may cause additional problems during testing, perforation, fluid injection, and/or fluid production. If the pressure and/or temperature inside the pipe string increases, the pipe string may expand and stress the surrounding cement sheath. This may cause the cement sheath to crack, or the bond between the outside surface of the pipe string and the cement sheath to fail, thereby breaking the hydraulic seal between the two. As used herein, the term "bond" encompasses adhesion between surfaces, for example between the cement sheath and the pipe string, on a macroscopic scale and/or attractive forces among portions of molecules on a molecular level, for example, among cement particles and elastomers, and may be ionic, covalent, or the weaker Van der Waals, dipole-dipole types, or any combination of such attractive forces. Furthermore, high temperature differentials created during production or injection of high temperature fluids through the well bore may cause fluids trapped in the cement sheath to thermally expand, causing high pressures within the sheath itself. Additionally, sudden changes in well bore temperatures and/or pressures due to change of fluid densities and temperatures possibly encountered during well bore operations (e.g., construction, remedial operations, fluid injection) subject the cement sheath to cyclic pressure and temperatures, and, if not designed properly, the cement sheath may fail due to its natural brittle properties. Furthermore, failure of the cement sheath also may be caused by forces exerted by shifts in subterranean formations surrounding the well bore, cement erosion, and repeated impacts from the drill bit and the drill pipe.

To counteract these problems, various additives may be included in the cement composition to enable the cement composition to withstand cyclic changes in imposed stresses. For example, hydrocarbon-based elastomers (for example, styrene-butadiene random and block copolymers, acrylonitrile-butadiene, and acrylonitrile-styrene-butadiene elastomers) have been included in cement compositions to modify the mechanical properties of the cement composition. Generally such materials are used in the particulate form. As used herein, the term "particulate" refers to materials in solid state having a well-defined physical shape as well as those with irregular geometries, including any particulates elastomers having the physical shape of platelets, shavings, fibers, flakes, ribbons, rods, strips, spheroids, hollow beads, toroids, pellets, tablets, or any other physical shape. The particulate elastomers may function to control shrinkage cracking in the early stages of the cement setting process, and also may provide resiliency, ductility, and toughness to the set cement composition so that it resists cracking or fracturing. Further, if fracturing or cracking does occur, the particulate elastomers may function to hold the set cement composition together, thereby resisting fall back of the cement sheath. Particulate elastomers also may dissipate stresses more effectively than the cement matrix, thus potentially shielding the cement composition from failing by catastrophic development of fractures and cracks.

The use of particulate elastomers in cement compositions, however, may be problematic. Commonly used particulate elastomers generally contain monomers (such as styrene, butadiene, ethylene, or propylene) that are highly hydrophobic and non-polar. As a result, conventional particulate elastomers are generally non-polar and hydrophobic, while the cement matrix is generally polar and hydrophilic. Due to the hydrophobic nature of conventional particulate elastomers, they generally do not adhere or bond to the cement matrix. Accordingly, the resultant set cement may have a polar and hydrophilic cement matrix with the unbonded and hydrophobic particulate elastomers dispersed therein. The presence of these unbonded particulate elastomers in the cement matrix generally does not allow for the effective transfer of stress from the cement matrix to the particulate elastomers dispersed therein. Additionally, the adhesion of the cement composition to casing and/or formation surfaces may also be compromised due to the poor adhesion of hydrophobic materials to metal and/or formation surfaces resulting in debonding from such surfaces and creating channels for the undesired flow of fluids. Furthermore, addition of such hydrophobic elastomers, which typically have densities either close to or less than that of water, to cement slurries causes them to either float in the slurry or otherwise separate from the cement solids. Addition of the hydrophobic elastomers to the mix water prior to addition of cement may cause the elastomer to float in the mix water so that uniform elastomer distribution into the cement slurry becomes problematic.

Aqueous latex emulsions of elastomeric polymeric materials typically contain small amounts of carboxylic acid containing monomers. For example, styrene butadiene aqueous latex emulsions typically contain small amounts of carboxylic acid containing monomers during polymerization of the styrene and butadiene to provide stability to the aqueous emulsion. However, such latex emulsions may problematic, in that they tend to gel cement compositions and may require large amounts of surfactants to stabilize the cement latex mixtures against premature gelling of cement slurries. Additional problems with the use of latex emulsions in cement compositions include their general lack of stability to the presence of salts and tendency to gel cement compositions at elevated temperatures. Furthermore, aqueous latex emulsions are designed to be film-forming polymer compositions when the water is removed, for example, when the water in cement slurry is consumed in hydration reactions of cement. Such film-forming polymer compositions are not expected to be effective as stress absorbers in cement compositions relative to particulate elastomers which retain their particulate nature even under well bore conditions. Even when a particulate elastomer softens or melts under well bore conditions, it generally remains as a localized softened elastomer or as liquid droplets in the cement matrix instead of forming a film over hydrated cement particles, and thus generally may serve as stress relief sites.

SUMMARY

The present invention relates to cementing operations and, more particularly, to cement compositions comprising particulate carboxylated elastomers and associated methods. As used herein, a "carboxylated elastomer" refers to an elastomer comprising a carboxy group.

One embodiment of the present invention provides a method of cementing comprising: providing a cement composition comprising water, a cement, and a particulate elastomer comprising a carboxy group; and allowing the cement composition to set.

Another embodiment of the present invention provides a method of cementing comprising: providing a cement composition comprising water, a cement, and a particulate elastomer comprising a carboxy group; introducing the cement composition into a subterranean formation; and allowing the cement composition to set therein.

Another embodiment of the present invention provides a method of enhancing the mechanical properties and elasticity of a cement composition, comprising: including a particulate elastomer comprising a carboxy group in the cement composition so that the cement composition comprises water, a cement, and the particulate elastomer; introducing the cementing composition into a subterranean formation; and allowing the cement composition to set therein.

Another embodiment of the present invention provides a method of enhancing adhesion between a cement composition and a pipe string and/or a subterranean formation comprising: including a particulate elastomer comprising a carboxy group in the cement composition so that the cement composition comprises water, a cement, and the particulate elastomer; introducing the cementing composition into the subterranean formation; and allowing the cement composition to set therein.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention and should not be used to limit or define the invention.

DESCRIPTION OF PREFERRED EMBODIMENTS

The present invention relates to cementing operations and, more particularly, to cement compositions comprising particulate carboxylated elastomers and associated methods. While the compositions and methods of the present invention are useful in a variety of surface and subterranean cementing operations, they are particularly useful in primary cementing, e.g., cementing casings and liners in well bores, including those in multi-lateral subterranean wells.

The cement compositions of the present invention generally comprise water, a cement, and a particulate carboxylated elastomer. Typically, the cement compositions of the present invention may have a density in the range of from about 4 pounds per gallon ("ppg") to about 20 ppg. In certain embodiments, the cement compositions may have a density in the range of from about 8 ppg to about 17 ppg. The cement compositions may be foamed or unfoamed or may comprise other means to reduce their densities, such as hollow microspheres, low-density elastic beads, or other density-reducing additives known in the art. Those of ordinary skill in the art, with the benefit of this disclosure, will recognize the appropriate density of the cement composition for a particular application.

The water used in the cement compositions of the present invention may be freshwater, saltwater (e.g., water containing one or more salts dissolved therein), brine (e.g., saturated saltwater produced from subterranean formations), seawater, or combinations thereof. Generally, the water may be from any source, provided that it does not contain an excess of compounds that adversely affect other components in the cement composition. The water may be present in an amount sufficient to form a pumpable slurry. More particularly, the water may be present in the cement compositions of the present invention in an amount in the range of from about 24% to about 200% by weight of cement ("bwoc"). In some embodiments, the water may be present in an amount in the range of from about 35% to about 90% bwoc.

Any cement suitable for use in subterranean cementing operations may be used in accordance with the present invention. Suitable examples include hydraulic cements that comprise calcium, magnesium, aluminum, silicon, oxygen, and/or sulfur, which set and harden by reaction with water. Such hydraulic cements, include, but are not limited to, Portland cements, pozzolana cements, gypsum cements, high alumina content cements, slag cements, silica cements, magnesia cements (commonly referred to as "Sorel cements"), and combinations thereof. In certain embodiments, the cement may comprise a Portland cement. In some embodiments, the Portland cements that are suited for use in the present invention are classified as Class A, C, H, and G cements according to American Petroleum Institute, *API Specification for Materials and Testing for Well Cements*, API Specification 10, Fifth Ed., Jul. 1, 1990.

Figure 1:
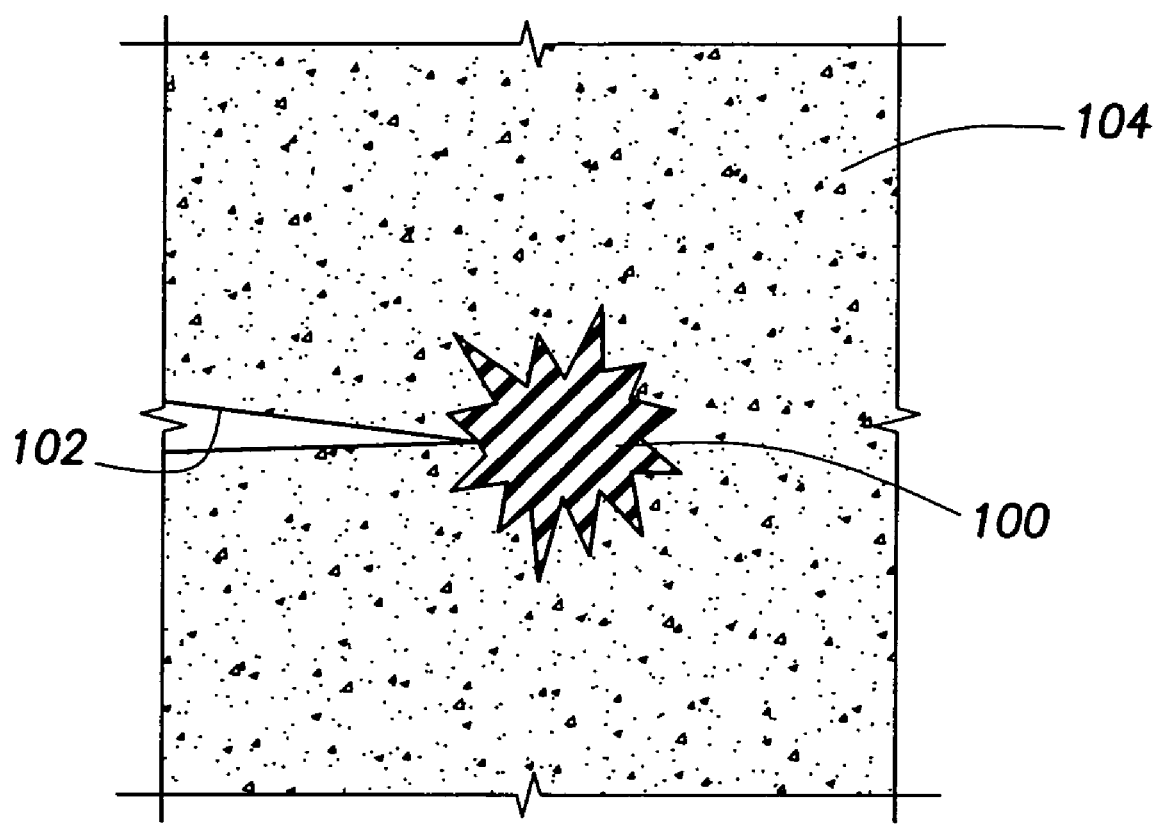
FIG. 1 is a schematic illustration of stress arrest due to a particulate carboxylated elastomer in accordance with one embodiment of the present invention.

The cement compositions of the present invention further comprise a particulate carboxylated elastomer. In some embodiments the carboxylated elastomer is cross-linked. The particulate elastomer generally should be capable of retaining its particulate nature at well bore conditions, for example, after introduction into the subterranean formation. In some embodiments, these particulate elastomers are thermoplastic, in that the particulate elastomers may melt upon heating and solidify upon cooling. This melting and cooling may be repeated, dependent upon temperature changes. Among other things, the particulate carboxylated elastomer may enable the cement sheath to withstand stresses that may otherwise lead to failure (e.g., cracking, fractures, debonding, etc.). Referring now to FIG. 1, stress arrest due to particulate carboxylated elastomer 100 is schematically illustrated. For example, carboxylated elastomer 100 may act to prevent further propagation of crack 102 in cement matrix 104.

Furthermore, the inclusion of carboxy groups in the particulate elastomers adds polar functional groups to the elastomer. Due to this added polarity, the particulate carboxylated elastomer generally should be capable of bonding with the cement matrix. Additionally, the carboxy group should generally provide improved adhesion to metal surfaces (e.g., casing), due to ionic bonding between metal ions (e.g., iron (3+) ions) in the oxidized surface of the casing and the carboxy groups. The carboxy group also generally should provide improved adhesion to formation surfaces, due to ionic bonding between calcium ions in the formation surfaces and carboxy groups. Such improved bonding may provide improved shear resistance leading to protection against debonding due to shear stresses between the set cement and casing and/or between the formation and the set cement. These particulate carboxylated elastomers may act to provide resiliency and impact resistance to the set cement composition. The particulate carboxylated elastomers also may improve the mechanical properties of the set cement composition, for example, increasing tensile strengths and compressive strengths and/or decreasing the Young's modulus. The particulate carboxylated elastomers also may facilitate the preparation of uniform mixtures because the particulate carboxylated elastomers may form stable suspensions in water.

Suitable carboxy groups that may be substituents on an elastomer include, but are not limited to, any group containing a carbon atom that is linked by a double bond to one oxygen atom, by one single bond to another carbon, and by another single bond to an oxygen, nitrogen, sulfur, or another carboxy carbon. One suitable carboxy group contained in the particulate elastomer may be represented by the general formula COOR, wherein R may be a hydrogen, a metal (for example, an alkali metal, an alkaline earth metal, or a transition metal), an ammonium or a quaternary ammonium group, an acyl group (for example acetyl ($CH_3C(O)$) group), an alkyl group (such as an ester), an acid anhydride group, and combinations thereof. Examples of suitable carboxy groups include, but are not limited to, carboxylic acid, carboxy esters, carboxy acid anhydrides, and monovalent, divalent, and trivalent metal salts of carboxy acids, derivatives thereof, and combinations thereof. In some embodiments, the particulate elastomers may be modified with carboxylic acid derivatives which can potentially generate carboxy groups, represented by the general formula COOR, upon exposure to aqueous fluids under basic conditions (e.g., pH>7) and/or to elevated temperatures. Cement compositions, particularly those containing Portland cement, generally have pH values greater than about 10. Examples of carboxylic acid derivatives that may generate suitable carboxy groups include amides (—C(O)NHR', wherein R' may be a hydrogen, an alkyl group, a hydroxyalkyl group, or 2-methyl-1-propane sulfonic acid or its salts).

The carboxy groups may be present in the particulate elastomer in an amount sufficient to provide the desired polarity. In some embodiments, the carboxy group may be present in the particulate elastomer in an amount in the range of from about 0.01% to about 20% by weight of the particulate elastomer. In some embodiments, the carboxy group may be present in the particulate elastomer in an amount in the range of from about 0.5% to about 10% by weight of the particulate elastomer.

Introduction of the carboxy groups into the particulate elastomer may be carried out by a variety of different methods. In some embodiments, the carboxy groups may be introduced during polymerization of the elastomer by copolymerization with a monomer comprising a carboxy group. In some embodiments, the carboxy groups may be introduced by grafting carboxy groups onto a hydrophobic particulate elastomer.

One method of introducing the carboxy groups is by copolymerization with a monomer comprising a carboxy group. For example, an olefin monomer may be copolymerized with a monomer comprising a carboxy group. Examples of suitable olefin monomers, include, but are not limited to, styrene, vinyltoluene, alpha-methylestyrene, butadiene, isoprene, hexadiene, dichlorovinylidene, vinylchloride, ethylene, propylene, butylene, and isobutylene. Examples of suitable monomers comprising a carboxy group include, but are not limited to, acrylic acid, alkyacrylate, alkyl alkacrylates, maleic anhydride, maleimide, acrylamide and 2-acrylamido-2-methyl-1-propane sulfonic acid.

A variety of different particulate carboxylated elastomers may be used that have been prepared by copolymerization. Examples of suitable particulate carboxylated elastomers formed from this copolymerization include, but are not limited to, ethylene acrylic acid comonomers, copolymers that comprise styrene and acrylic acid esters, copolymers that comprise ethylene and acrylic acid esters, and combinations thereof. The term "copolymer," as used herein, is not limited to polymers comprising two types of monomeric units, but includes any combination of monomers, e.g., terpolymers, tetrapolymers, and the like. Additionally, the term "copolymer," or "comonomer," as used herein, is intended to include both the acid form of the copolymer, or comonomer, its derivative forms such as esters, amides, anhydrides, imides, and its various salts. Suitable examples of commercially available ethylene acrylate copolymers are available under the trade names SURLYN®, ACE 1055, and VAMAC® copolymers from Dupont. Another suitable ethylene acrylic acid comonomer is commercially available as a water emulsion under the trade name ADCOTE™ 37-220 adhesive from Rohm and Hass Corporation. An example of a suitable copolymer that comprises ethylene and an acrylic acid ester is an experimental product (V-1921601-60) available as a 60% solid emulsion from 3M Corporation. Another example of a suitable copolymer that comprises ethylene and an acrylic acid ester is an experimental product (V-19219) available as an aqueous emulsion from 3M Corporation.

In accordance with one embodiment of the present invention, a segment of a carboxylated elastomer that was obtained by copolymerization with a monomer comprising a carboxy group is graphically illustrated below by Formula I. The carboxylated elastomer comprises an elastomer backbone and carboxy pendant groups.

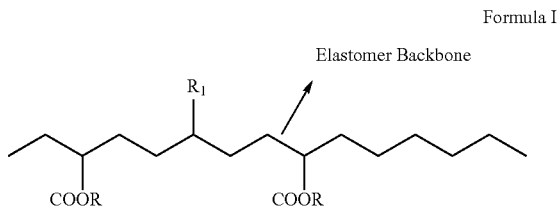

Formula I wherein R may be a hydrogen, a metal (for example, an alkali metal, an alkaline earth metal, or a transition metal), an ammonium or a quaternary ammonium group, an acyl group (for example acetyl ($CH_3C(O)$) group), an alkyl group (such as an ester), an acid anhydride group, and combinations thereof; and $R_1$ may be a hydrogen, an alkyl, or an aryl group.

Another example method for introducing the carboxy groups into the particulate elastomer is by grafting carboxy groups onto a hydrophobic particulate elastomer. For example, such a grafted particulate carboxylated elastomer may comprise an elastomer backbone and graft carboxy groups. Suitable elastomers that may be grafted with carboxylating materials generally comprise olefin monomers, including, but are not limited to, styrene, vinyltoluene, alpha-methylestyrene, butadiene, isoprene, hexadiene, dichlorovinylidene, vinylchloride, acrylonitrile, ethylene, propylene, butylene, isobutylene, and combinations and copolymers thereof. Elastomers containing these olefin monomers may include styrene butadiene random and block copolymers, hydrogenated styrene butadiene random and block copolymers, acrylonitrile butadiene styrene ("ABS") copolymers, ethylene-propylene-diene-monomer (EPDM) copolymers, styrene-acrylic copolymers, acrylonitrile butadiene rubber (NBR) polymers, methylmethacrylate butadiene styrene (MBS) rubbers, and styrene-acrynitrile rubbers. Carboxy groups may be grafted onto a hydrophobic particulate elastomer to form a suitable graft particulate elastomer using a variety of suitable carboxylating materials, including, but not limited to, maleic acid, maleic anhydride, and diesters and monoesters of maleic acid, maleimide, fumaric acid and its derivatives, acrylic acid, alkylacrylate, alkylalkacrylates, acrylamide, 2-acrylamido-2-methyl-1-propanesulfonic acid and its salts.

Examples of suitable graft particulate elastomers include, but are not limited to, maleated polybutadienes, maleated styrene butadiene rubbers ("SBR"), maleated acrylonitrile-styrene-butadiene ("ABS") rubbers, maleated nitrile-butadiene rubbers ("NBR"), maleated hydrogenated acrylonitrile butadiene rubbers ("HNBR"), methylmethacrylate butadiene styrene ("MBS") rubbers, carboxylated ethylene-propylene-diene monomer rubbers, carboxylated styrene-acrynitrile rubbers ("SAN"), carboxylated ethylene propylene diene rubbers ("EPDM"), acrylic grafted silicone rubbers, and combinations thereof. An example of a suitable hydrogenated acrylonitrile butadiene rubber ("HNBR") that is grafted with carboxylating materials is available from Lanxess Corporation, Leverkusen, Germany, under the trade name THERBAN® XT. An example of a suitable nitrile-butadiene rubbers ("NBR") that is grafted with carboxylating materials is available from Zeon Chemicals, L.P., Louisville, Ky., under the trade name NIPOL® NBR 1072 CGX. Examples of suitable butadiene based rubbers that are grafted with carboxylating materials are available from Mitsubishi Rayon Company Ltd., Tokyo, Japan, under the trade names METABLENS® C and E. An example of an acrylic rubber that is grafted with carboxylating materials is available from Mitsubishi Rayon Company Limited, Tokyo, Japan, under the trade name METABLEN® W. An example of a suitable silicone based elastomer that is grafted with carboxylating materials is available from Mitsubishi Rayon America Inc., New York, N.Y., under the trade name METABLEN® S. An example of a suitable styrene butadiene particulate elastomer grafted with maleic acid available as an experimental product (Eliokem XPR-100) from Eliokem Corporation.

Figure 2:
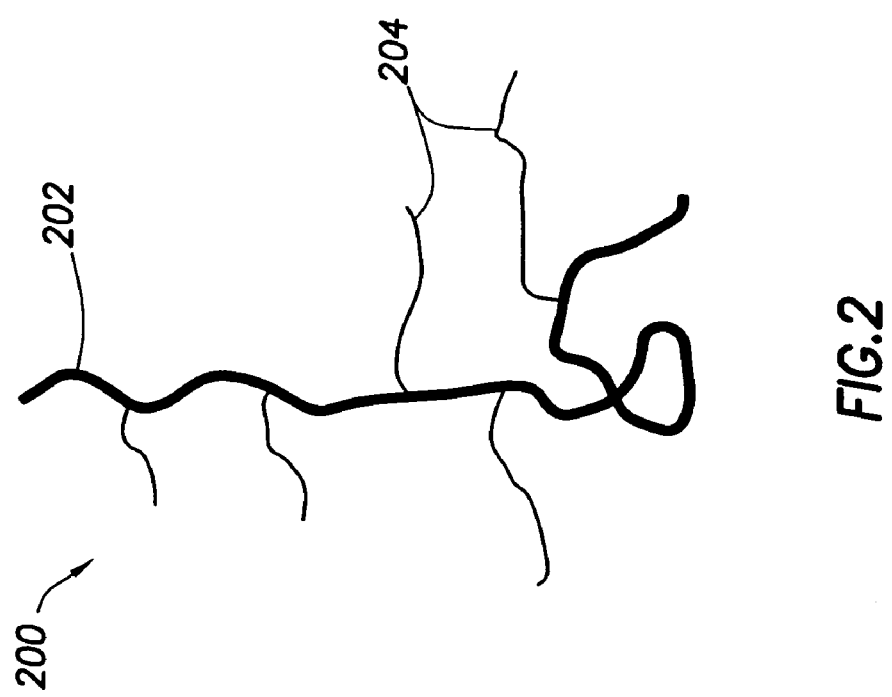
FIG. 2 is a graphic illustration of a segment of a carboxylated elastomer that comprises an elastomer and graft carboxy groups, in accordance with one embodiment of the present invention.

Referring now to FIG. 2, grafted carboxylated elastomer 200 is graphically illustrated, in accordance with one embodiment of the present invention. Grafted carboxylated elastomer 200 comprises elastomer backbone 202 and graft carboxy groups 204.

Grafting of elastomers with carboxylating materials may be achieved by any suitable methodology. In some embodiments, suitable graft particulate elastomers may be prepared by polymerizing a monomer (the carboxylating material) in the presence of a preformed polymer backbone (the preformed elastomer). In some embodiments, preparation of suitable graft particulates elastomers comprises a free radical graft polymerization method. Free radical graft polymerization generally requires mixing a radical source (e.g., an organic peroxide), the carboxylating material (e.g., maleic acid or maleic anhydride), and the elastomer. This mixture may then be reacted by heating without a solvent. Suitable free radical graft polymerization methods are described in the *Encyclopedia of Polymer Science and Engineering*, Second ed., Vol. 7, pp. 551-579, Wiley Interscience Publications, edited by J. J. Kroschwitz. Examples of additional suitable methods of graft polymerizations include radiation grafting and Plasma grafting which may be used for room temperature surface grafting. Grafting by polymerizing a carboxylating material onto a preformed elastomer results in blocks of grafted material covalently attached to the preformed elastomer, may be the preferred method of obtaining the block polymer structure, in cases where the two blocks (the carboxylating material and the elastomer), are chemically incompatible (for example, highly hydrophobic and highly hydrophilic), and cannot be easily copolymerized from a monomer mixture. In some embodiments, surface grafting on the elastomer may result in the graft particulate elastomers having a core-shell morphology, wherein the graft particulate elastomer comprises an elastomer core and a shell that comprises the carboxy groups.

Figure 3:
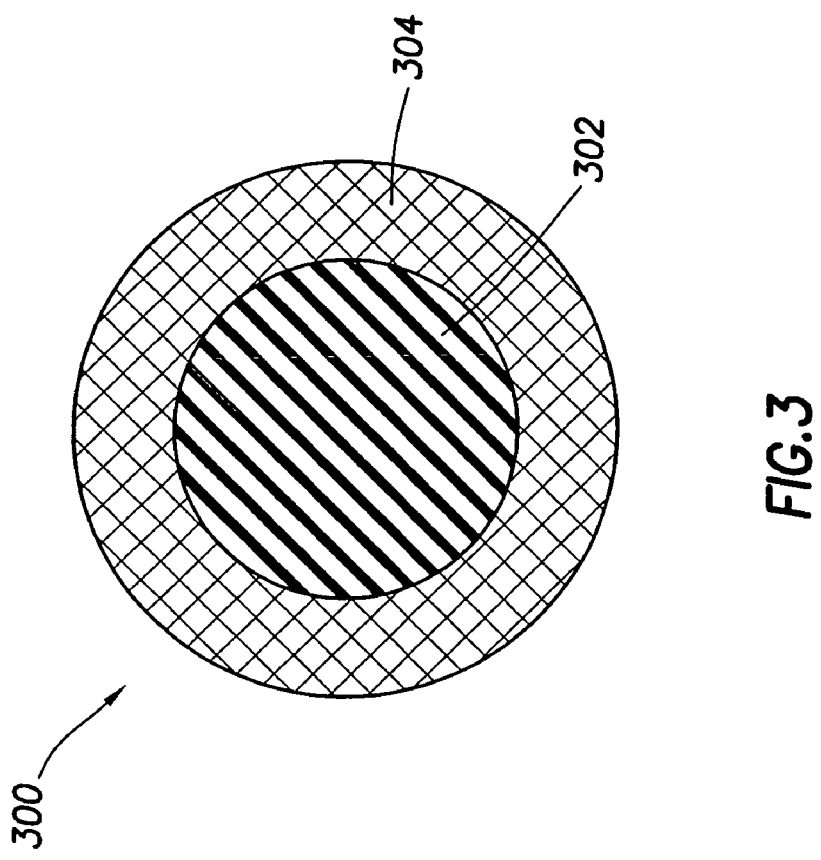
FIG. 3 is a graphic illustration of a segment of a carboxylated elastomer having a core-shell morphology, in accordance with one embodiment of the present invention.

Referring now to FIG. 3, a segment of grafted particulate elastomer 300 having a core-shell morphology is graphically illustrated, in accordance with one embodiment of the present invention. Grafted particulate elastomer 300 comprises elastomer core 302 and shell 304 that comprises carboxy groups.

The particulate carboxylated elastomers should be present in the cement compositions of the present invention in an amount sufficient to provide the desired mechanical properties, including resiliency, compressive strength, and tensile strength. In some embodiments, the particulate carboxylated elastomers are present in the cement compositions of the present invention in an amount in the range of from about 0.5% to about 25% by weight of total solids. As used herein, "by weight of total solids" refers to the weight included in the cement compositions relative to the total weight of the total solids (such as cement, silica, the particulate elastomers, etc.) included in the cement composition. In some embodiments, the particulate carboxylated elastomers are present in an amount in the range of from about 1% to about 20% by weight of total solids. In some embodiments, the particulate carboxylated elastomers are present in an amount in the range of from about 4% to about 15% by weight of total solids.

The particulate carboxylated elastomers may have a wide variety of shapes and sizes of individual particles suitable for use in the cement compositions of the present invention. The particulate carboxylated elastomers may have well-defined physical shapes as well as irregular geometries, including the physical shape of platelets, shavings, fibers, flakes, ribbons, rods, strips, spheroids, hollow beads, toroids, pellets, tablets, or any other physical shape. In some embodiments, the particulate carboxylated elastomers may have a median size in the range of from about 5 microns to about 1,500 microns. In some embodiments, the particulate carboxylated elastomers may have a median size in the range of from about 20 microns to about 500 microns. However, particle sizes outside these defined ranges also may be suitable for particular applications.

Optionally, the cement compositions of the present invention further may comprise a hydrophobic particulate elastomer. While hydrophobic particulate elastomers generally do not bond to the cement matrix, it is believed that the particulate carboxylated elastomers included in the cement compositions of the present invention may act as "coupling agents" or "compatibilizers" between these two incompatible phases, the cement matrix and the hydrophobic particulate elastomer. The phrase "coupling agent," as used herein, refers to a material that aids the bonding between two incompatible materials (for example, an inorganic filler in an organic matrix or vice versa) by forming bonds with both the materials through appropriate portions of the structure. Thus, for example, the carboxy groups in the particulate carboxylated elastomer should bond with the ionic and polar cement particles, and the elastomer portion of the particulate carboxylated elastomer should bond with the hydrophobic elastomer in the cement compositions. Since such materials combine the structural components of two separate polarity mismatched or incompatible materials, and serve to provide a structurally homogeneous composites by mutually bonding with the materials they also may be referred to as "compatibilizers" and generally should improve overall adhesion between two incompatible phases in a composite matrix.

Any hydrophobic particulate elastomers suitable for use in cementing operations may be used. Examples of suitable hydrophobic particulate elastomers include hydrocarbon-based particulate elastomers. Hydrocarbon-based particulate elastomers that may be included in the cement compositions include, but are not limited to, styrene butadiene random and block copolymers, acrylonitrile butadiene styrene ("ABS") copolymers, ethylene-propylene-diene-monomer (EPDM) copolymers, styrene-acrylic copolymers, acrylonitrile butadiene rubber (NBR) polymers, methylmethacrylate butadiene styrene (MBS) rubbers, styrene-acrynitrile rubbers (SAN), and combinations thereof.

Where present, the hydrophobic particulate elastomers may be included in the cement compositions of the present invention in an amount in the range of from about 1% to about 50% by weight of total solids. In some embodiments, the hydrophobic particulate elastomers may be present in an amount in the range of from about 4% to about 25% by weight of total solids. In some embodiments, the hydrophobic particulate elastomers may be included in the cement compositions in a hydrophobic particulate elastomer to particulate carboxylated elastomer weight ratio in the range of from about 20:1 to about 1:10. In some embodiments, the hydrophobic particulate elastomer to particulate carboxylated elastomer weight ratio may be in the range of from about 10:1 to about 1:4. In some embodiments, the hydrophobic particulate elastomer to particulate carboxylated elastomer weight ratio may be in the range of from about 10:1 to about 1:1.

Other additives suitable for use in subterranean well bore cementing operations also may be added to these compositions. Other additives, include, but are not limited to, foaming agents, defoamers, dispersants, retardants, accelerants, fluid loss control additives, weighting agents, vitrified shale, lightweight additives (e.g., bentonite, gilsonite, glass spheres, etc.), and fly ash, and combinations thereof. A person of ordinary skill in the art, with the benefit of this disclosure, will know the type and amount of additive useful for a particular application and desired result.

An example method of the present invention is a method of cementing that comprises providing a cement composition comprising water, a cement, and a particulate carboxylated elastomer; and allowing the cement composition to set. In some embodiments, the methods of the present invention further may comprise introducing the cement composition into a subterranean formation. The step of introducing the cement composition may comprise introducing the cement composition into a well bore, for example, in the annulus between the wall of the well bore and a pipe string disposed in the well bore.

To facilitate a better understanding of the present invention, the following examples of certain aspects of some embodiments are given. In no way should the following examples be read to limit, or define, the scope of the invention.

EXAMPLE 1

Sample cement slurries using Class H cement were prepared according to API Recommended Practices 10B, Twenty-Second Edition, December 1997. Samples for mechanical property measurements were prepared by curing the slurries in 2"×5" metal cylinders at 190° F. for 72 hours under a pressure of 3,000 psi. Thereafter, tests for measuring the Young's modulus, compressive strength, and Poisson's ratio were performed on the set samples by load vs. displacement measurements in accordance with ASTM D3148-02 (Standard Test Method for Elastic Moduli of Intact Rock Core Specimens in Uniaxial Compression). The tensile strengths were measured on dog-bone briquettes using a Tinius-Olsen Load Frame Instrument according to CRD-C 260-01 in the U.S. Army Corps of Engineers' Handbook for Concrete and Cement.

Sample No. 1 (comparative) comprised cement, water in an amount of 35.3% by weight of the cement ("bwoc"), and a styrene butadiene copolymer elastomer (FDP 665 from Halliburton Energy Services, Inc.) in an amount of 4% bwoc.

Sample No. 2 comprised cement, water in an amount of 35.3% bwoc, and a styrene butadiene elastomer grafted with maleic acid (Eliokem XPR-100 from Eliokem Corporation) in an amount of 4% bwoc. The densities of both Sample No. 1 and Sample No. 2 were kept substantially identical at 16.4 ppg.

The results of these tests are shown in the table below.

TABLE 1

| Component | Sample No. 1 (comparative) | Sample No. 2 |
|---|---|---|
| Cement (% bwoc) | 100 | 100 |
| Water (% bwoc) | 35.3 | 35.3 |

TABLE 1-continued

| Component | Sample No. 1 (comparative) | Sample No. 2 |
|---|---|---|
| Styrene Butadiene Copolymer Elastomer (% bwoc) | 4 | 0 |
| Styrene Butadiene Elastomer Grafted with Maleic Acid (% bwoc) | 0 | 4 |
| Density (ppg) | 16.4 | 16.4 |
| 72-Hour Tensile Strength (psi) | 510 | 650 |
| 72-Hour Compressive Strength (psi) | 5,800 | 6,540 |
| Young's Modulus (psi) | 1.93E+6 | 1.93E+6 |
| Poisson's Ratio | 0.208 | 0.210 |

According, Example 1 illustrates that the tensile and compressive strengths of cement compositions may be enhanced by the addition of an elastomer comprising a carboxy group.

EXAMPLE 2

Sample cement slurries were prepared at room temperature and cured at 190° F. for 72 hours under a pressure of 3,000 psi and tested for mechanical properties as described in Example 1.

Sample No. 3 (comparative) comprised cement, water in an amount of 35% bwoc, and a styrene butadiene copolymer elastomer (FDP 665) in an amount of 4% bwoc.

Sample No. 4 comprised cement, water in an amount of 34.2% bwoc, a styrene butadiene copolymer elastomer (FDP 665) in an amount of 4% bwoc, and an ethylene acrylic copolymer elastomer in an aqueous emulsion (V-19219 from 3M Corporation) in an amount of 1% bwoc.

Sample No. 5 comprised cement, water in an amount of 34.2% bwoc, a styrene butadiene copolymer elastomer (FDP 665) in an amount of 4% bwoc, and a styrene maleic ester copolymer elastomer in an amount of 1% bwoc. The styrene maleic ester copolymer elastomer used in this sample comprised a copolymer of styrene and maleic acid partially esterified with secondary butanol and methanol, obtained from Aldrich Chemical Company. The densities of Sample No. 3, Sample No. 4, and Sample No. 5 were kept substantially identical at 16.4 ppg.

The results of these tests are shown in the table below.

TABLE 2

| Component | Sample No. 3 (comparative) | Sample No. 4 | Sample No. 5 |
|---|---|---|---|
| Cement (% bwoc) | 100 | 100 | 100 |
| Water (% bwoc) | 35 | 34.2 | 34.2 |
| Styrene Butadiene Copolymer Elastomer (% bwoc) | 4 | 4 | 4 |
| Ethylene Acrylic Copolymer Elastomer (% bwoc) | 0 | 1 | 0 |
| Styrene Maleic Ester Copolymer Elastomer (% bwoc) | 0 | 0 | 1 |
| Density (ppg) | 16.4 | 16.4 | 16.4 |
| 72-Hour Tensile Strength (psi) | 450 | 470 | 535 |
| 72-Hour Compressive Strength (psi) | 6,160 | 5,260 | 5,940 |
| Young's Modulus (psi) | 2.0E+6 | 1.83E+6 | 1.90E+6 |
| Poisson's Ratio | 0.207 | 0.203 | 0.197 |

According, Example 2 illustrates that cement compositions with tensile strength enhancement and/or lowering of Young's Modulus may be achieved by inclusion of a carboxylated elastomer.

EXAMPLE 3

Sample cement slurries were prepared at room temperature and cured for 72 hours under a pressure of 3,000 psi at two different temperatures, and tested for mechanical properties as described in Example 1. The dog bone samples for the tensile strength tests were cured at 190° F., and the cylinders for the uniaxial test were cured at 140° F.

Sample No. 6 (comparative) comprised cement, water in an amount of 35% bwoc, and a styrene butadiene copolymer elastomer (FDP 665) in an amount of 4% bwoc.

Sample No. 7 comprised cement, water in an amount of 34.2% bwoc, a styrene butadiene copolymer elastomer (FDP 665) in an amount of 4% bwoc, and a styrene butadiene elastomer grafted with maleic acid (Eliokem XPR-100) in an amount of 1% bwoc. The densities of both Sample No. 6 and Sample No. 7 were kept substantially identical at 16.4 ppg.

The results of these tests are shown in the table below.

TABLE 3

| Component | Sample No. 6 (comparative) | Sample No. 7 |
|---|---|---|
| Cement (% bwoc) | 100 | 100 |
| Water (% bwoc) | 35 | 34.2 |
| Styrene Butadiene Copolymer Elastomer (% bwoc) | 4 | 4 |
| Styrene Butadiene Elastomer Grafted with Maleic Acid (% bwoc) | 0 | 1 |
| Density (ppg) | 16.4 | 16.4 |
| 72-Hour Tensile Strength (psi) | 510 | 500 |
| 72-Hour Compressive Strength (psi) | 3,040 | 3,030 |
| Young's Modulus (psi) | 1.45E+6 | 1.39E+6 |
| Poisson's Ratio | 0.180 | 0.176 |

According, Example 3 illustrates that modification of the elastomer with a carboxylating material (e.g., maleic acid) lowered the Young's modulus of the cement composition so that it was less brittle.

EXAMPLE 4

Sample cement slurries were prepared at room temperature and cured at 190° F. for 72 hours under a pressure of 3,000 psi and tested for mechanical properties as described in Example 1.

Sample No. 8 comprised cement, water in an amount of 33.2% bwoc, and an ethylene acrylate ester copolymer elastomer in an amount of 3.7% bwoc. The ethylene acrylate copolymer elastomer was obtained as a 60% solid emulsion (V-19219-60) from 3M Corporation.

Sample No. 9 comprised cement, water in an amount of 36.3% bwoc, and an ethylene acrylate ester copolymer elastomer in an amount of 1% bwoc. The ethylene acrylate copolymer elastomer was obtained as a 60% solid emulsion (V-19219-60) from 3M Corporation.

Sample No. 10 comprised cement, water in an amount of 36.3% bwoc, and an ethylene acrylic acid salt comonomer elastomer (ADCOTE™ 37-220 adhesive from Rohm and Haas Corporation) in an amount of 1.86% bwoc.

The results of these tests are shown in the table below.

TABLE 4

| Component | Sample No. 8 | Sample No. 9 | Sample No. 10 |
|---|---|---|---|
| Cement (% bwoc) | 100 | 100 | 100 |
| Water (% bwoc) | 33.2 | 36.3 | 36.3 |
| Ethylene Acrylate Ester Copolymer Elastomer (% bwoc) | 3.7 | 1.85 | 0 |
| Ethylene Acrylic Acid Salt Comonomer Elastomer (% bwoc) | 0 | 0 | 1.86 |
| Density (ppg) | 16.4 | 16.4 | 16.4 |
| 72-Hour Tensile Strength (psi) | 575 | 480 | 490 |
| 72-Hour Compressive Strength (psi) | 7,470 | 6,220 | 8,610 |
| Young's Modulus (psi) | 2.1E+6 | 2.0E+6 | 2.02E+6 |
| Poisson's Ratio | 0.161 | 0.186 | 0.172 |

Accordingly, Example 4 illustrates that the inclusion of a suitably carboxylated elastomer in a cement composition may provide improvement in mechanical properties.

EXAMPLE 5

Sample cement slurries were prepared at room temperature and tested for shear bond strength. For measuring shear bond strength of the set sample to metal surfaces, the sample cement slurries were allowed to set in the annuluses of pipe assemblies, i.e., small pipes centered inside larger pipes. The molds were cured at 1800° F. After setting, the shear bond strength of each portion was determined by supporting the larger pipe and applying force to the smaller inner pipe. The shear bond strength is the total force applied divided by the bonded surface area which breaks.

Sample No. 11 comprised cement, water in an amount of 36.3% bwoc, and an ethylene acrylic acid salt comonomer (ADCOTE™ 37-220 adhesive) in an amount of 0.93% bwoc. The carboxy-containing particulate elastomer included in this sample comprised.

Sample No. 12 comprised cement, water in an amount of 37.2% bwoc, and an ethylene acrylic acid salt comonomer (ADCOTE™ 37-220 adhesive) in an amount of 0.45% bwoc.

Sample No. 13 (comparative) comprised cement and water in an amount of 39.0% bwoc. The densities of Sample No. 11, Sample No. 12, and Sample No. 13 were kept substantially identical at 16.4 ppg.

The results of these tests are shown in the table below.

TABLE 5

| Component | Sample No. 11 | Sample No. 12 | Sample No. 13 (Comparative) |
|---|---|---|---|
| Cement (% bwoc) | 100 | 100 | 100 |
| Water (% bwoc) | 36.3 | 37.2 | 39.0 |
| Ethylene Acrylic Acid Salt Ionomer Elastomer (% bwoc) | 0.93 | 0.45 | 0 |
| Density (ppg) | 16.4 | 16.4 | 16.4 |
| Shear Strength (psi) | 380 | 330 | 265 |

According, Example 5 illustrates that the inclusion of a carboxylated elastomer in a cement composition may provide enhanced shear strength.

EXAMPLE 6

The effects of carboxylation on the resistance of cement compositions to cyclic stresses induced by axial stress cycling were studied by comparing a composition containing the base elastomer used for grafting with carboxy groups with that containing the elastomer which has been grafted with carboxy groups. Accordingly, Sample No. 14 was prepared and cured under conditions identical to those used for preparing and curing of Sample No. 2 with the exception that the styrene butadiene elastomer grafted with maleic acid (Eliokem XPR-100 from Eliokem Corporation) was replaced with the 8% bwoc of an ungrafted styrene butadiene elastomer (Eliokem XPR-99 from Eliokem Corporation), and the slurry density was 16.0 ppg.

Sample No. 15 was prepared and cured under conditions identical to those used for preparing and curing of Sample No. 2 with the exception that the amount of the styrene butadiene elastomer grafted with maleic acid (Eliokem XPR-100 from Eliokem Corporation) was increased to 8% bwoc, and the slurry density was 16.0 ppg.

The cyclic tests were designed to provide data about the cement response to initial load cycles starting at 50% of compressive strength and increasing 10% of compressive strength per cycle to the final level. The final level was set at the lower value of two standard deviations below the compressive strength, or 90% of compressive strength. The low stress level was set at the larger value of 100 psi, or 10% of compressive strength. The initial partial load cycles were performed under displacement control at a displacement rate of 5 E-5 inches per second, to match the displacement rate of the stress-strain tests. The cyclic portion of the tests were run under force control with the first 10 cycles at 4 minutes per cycle, the next 50 cycles at 2 minutes per cycle, the next 190 cycles at 1 minute per cycle, and the last cycles at 30 seconds per cycle.

Sample No. 15 lasted before failure an average of 240 cycles whereas samples from Composition No. 14 lasted 158 cycles indicating that grafting with carboxy groups improves cyclic resistance of cement compositions.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method of cementing comprising:
    providing a cement composition comprising a cement, water, and a particulate carboxylated elastomer, wherein the particulate carboxylated elastomer comprises a carboxy group, wherein the carboxy group is present in the particulate carboxylated elastomer in an amount in the range of from about 0.01% to about 20% by weight of the particulate carboxylated elastomer; and
    allowing the cement composition to set.

2. The method of claim 1 wherein the carboxy group of the particulate carboxylated elastomer has the formula COOR wherein R is a hydrogen, a metal, an ammonium group, a quaternary ammonium group, an acyl group, an alkyl group, an acid anhydride group, or a combination thereof.

3. The method of claim 1 wherein the particulate carboxylated elastomer is modified by a carboxylic acid derivative that generates the carboxy group.

4. The method of claim 1 wherein the carboxy group was introduced into the particulate carboxylated elastomer by copolymerization of an olefin monomer and a monomer comprising a carboxy group.

5. The method of claim 1 wherein the particulate carboxylated elastomer comprises at least one elastomer selected from the group consisting of an ethylene acrylic acid copolymer, a copolymer comprising styrene and an acrylic acid ester, a copolymer comprising ethylene and an acrylic acid ester, and combinations thereof.

6. The method of claim 1 wherein the particulate carboxylated elastomer is a graft particulate elastomer comprising a hydrophobic elastomer grafted with a carboxylating material.

7. The method of claim 1 wherein the particulate carboxylated elastomer comprises a graft particulate elastomer selected from the group consisting of a maleated polybutadiene, a maleated styrene butadiene rubber, a maleated acrylonitrile-styrene-butadiene rubber, a maleated nitrile-butadiene rubber, a maleated hydrogenated acrylonitrile butadiene rubber, a methylmethacrylate butadiene styrene rubber, a carboxylated ethylene-propylene-diene monomer rubber, a carboxylated styrene-acrynitrile rubber, a carboxylated ethylene propylene diene rubber, an acrylic grafted silicone rubber, and combinations thereof.

8. The method of claim 1 wherein the particulate carboxylated elastomer is present in the cement composition in an amount in the range of from about 0.5% to about 25% by weight of total solids present in the cement composition.

9. The method of claim 1 wherein the cement composition further comprises a hydrophobic particulate elastomer.

10. The method of claim 1 wherein the cement composition further comprises a hydrophobic particulate elastomer selected from the group consisting of a styrene butadiene random copolymer, a styrene butadiene block copolymer, an acrylonitrile butadiene styrene copolymer, an ethylene-propylene-diene-monomer copolymer, a styrene-acrylic copolymer, an acrylonitrile butadiene rubber polymer, a methylmethacrylate butadiene styrene rubber, a styrene-acrynitrile rubber, and combinations thereof.

11. The method of claim 1 wherein the particulate carboxylated elastomer has a size in the range of from about 5 microns to about 1,500 microns.

12. A method of cementing comprising:
providing a cement composition comprising a cement, water, and a particulate carboxylated elastomer, wherein the particulate carboxylated elastomer comprises a carboxy group, wherein the carboxy group is present in the particulate carboxylated elastomer in an amount in the range of from about 0.01% to about 20% by weight of the particulate carboxylated elastomer;
introducing the cement composition into a subterranean formation; and
allowing the cement composition to set therein.

13. The method of claim 12 wherein the particulate carboxylated elastomer is modified by a carboxylic acid derivative that generates the carboxy group.

14. The method of claim 12 wherein the carboxy group was introduced into the particulate carboxylated elastomer by copolymerization of an olefin monomer and a monomer comprising a carboxy group.

15. The method of claim 12 wherein the particulate carboxylated elastomer comprises at least one elastomer selected from the group consisting of an ethylene acrylic acid comonomer, a copolymer comprising styrene and an acrylic acid ester, a copolymer comprising ethylene and an acrylic acid ester, and combinations thereof.

16. The method of claim 12 wherein the particulate carboxylated elastomer is a graft particulate elastomer comprising a hydrophobic elastomer grafted with a carboxylating material.

17. The method of claim 12 wherein the particulate carboxylated elastomer comprises a graft particulate elastomer selected from the group consisting of a maleated polybutadiene, a maleated styrene butadiene rubber, a maleated acrylonitrile-styrene-butadiene rubber, a maleated nitrile-butadiene rubber, a maleated hydrogenated acrylonitrile butadiene rubber, a methylmethacrylate butadiene styrene rubber, a carboxylated ethylene-propylene-diene monomer rubber, a carboxylated styrene-acrynitrile rubber, a carboxylated ethylene propylene diene rubber, an acrylic grafted silicone rubber, and combinations thereof.

18. The method of claim 12 wherein the cement composition further comprises a hydrophobic particulate elastomer.

19. The method of claim 12 wherein the cement composition is introduced into an annulus between a wall of a well bore that penetrates the subterranean formation and a pipe string disposed in the well bore.

20. A method of enhancing the mechanical properties of a cement composition, comprising:
preparing a cement composition comprising a cement, water, and a particulate carboxylated elastomer having a carboxy group with the formula COOR wherein R is a hydrogen, a metal, an ammonium group, a quaternary ammonium group, an acyl group, an alkyl group, an acid anhydride group, or a combination thereof, wherein the carboxy group is present in the particulate carboxylated elastomer in an amount in the range of from about 0.01% to about 20% by weight of the particulate carboxylated elastomer;
introducing the cementing composition into a subterranean formation; and
allowing the cement composition to set therein.

21. A method of enhancing adhesion between a cement composition and casing and/or a subterranean formation comprising:
preparing a cement composition comprising a cement, water, and a particulate carboxylated elastomer having a carboxy group with the formula COOR wherein R is a hydrogen, a metal, an ammonium group, a quaternary ammonium group, an acyl group, an alkyl group, an acid anhydride group, or a combination thereof, wherein the carboxy group is present in the particulate carboxylated elastomer in an amount in the range of from about 0.01% to about 20% by weight of the particulate carboxylated elastomer;
introducing the cementing composition into the subterranean formation; and
allowing the cement composition to set therein.

22. The method of claim 21 wherein the cement composition is introduced into an annulus between a wall of a well bore that penetrates the subterranean formation and a pipe string disposed in the well bore.

* * * * *

UNITED STATES PATENT AND TRADEMARK OFFICE
CERTIFICATE OF CORRECTION

PATENT NO. : 7,650,940 B2 Page 1 of 1
APPLICATION NO. : 11/321113
DATED : January 26, 2010
INVENTOR(S) : Reddy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 103 days.

Signed and Sealed this

Twenty-third Day of November, 2010

David J. Kappos
*Director of the United States Patent and Trademark Office*